(12) United States Patent
Wu et al.

(10) Patent No.: US 11,287,923 B2
(45) Date of Patent: Mar. 29, 2022

(54) CONTROL METHOD OF HANDHELD ELECTRONIC DEVICE

(71) Applicant: ASUSTEK COMPUTER INC., Taipei (TW)

(72) Inventors: I-Hsi Wu, Taipei (TW); Hsin-Yi Pu, Taipei (TW); Wen-Fang Hsiao, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/915,501

(22) Filed: Jun. 29, 2020

(65) Prior Publication Data

US 2021/0004134 A1    Jan. 7, 2021

(30) Foreign Application Priority Data

Jul. 3, 2019 (TW) .................................. 108123464

(51) Int. Cl.
*G06F 3/041* (2006.01)
*G06F 3/0488* (2013.01)
*G06F 3/04886* (2022.01)

(52) U.S. Cl.
CPC ...... *G06F 3/04166* (2019.05); *G06F 3/04886* (2013.01); *G06F 2203/04104* (2013.01)

(58) Field of Classification Search
CPC ............. G06F 3/04886; G06F 3/04186; G06F 3/04166; G06F 2203/04104
See application file for complete search history.

(56) References Cited

U.S. PATENT DOCUMENTS

2014/0306905 A1* 10/2014 Kim .................... G06F 3/04886
345/173

FOREIGN PATENT DOCUMENTS

| CN | 102830844 A | 12/2012 |
| CN | 106569707 A | 4/2017 |
| CN | 108579078 A | 9/2018 |

* cited by examiner

*Primary Examiner* — Kent W Chang
*Assistant Examiner* — Chayce R Bibbee
(74) *Attorney, Agent, or Firm* — Muncy, Geissler, Olds & Lowe, P.C.

(57) ABSTRACT

A control method of a handheld electronic device adapted to a handheld electronic device is provided. The handheld electronic device includes a touch panel. The control method includes the steps of: dividing the touch panel into two areas, and defining a trigger region in each area; configuring the touch panel to detect a touch point; and determining whether the touch point is located in the trigger region or not, and when the touch point is located in the trigger region, forming a shielding region corresponding to the trigger region; and when the touch point is not located in the trigger region, repeatedly detecting the touch point.

8 Claims, 8 Drawing Sheets

CONTROL METHOD OF HANDHELD ELECTRONIC DEVICE

BACKGROUND OF THE INVENTION

Field of the Invention

The disclosure relates to a handheld electronic device and a control method thereof, and in particular, to a handheld electronic device for preventing an accidental touch and a control method thereof.

Description of the Related Art

With development of handheld electronic devices, games on the handheld electronic devices are also increasingly popular. Generally, a handheld device is equipped with a touchscreen for users to perform a touch operation.

To increase a field of view of a screen and improve user experience, a screen bezel of a handheld electronic device is increasingly narrow. However, a narrow-bezel design is disadvantageous to a touch operation. When operating a handheld electronic device with a narrow-bezel design, a user is likely to accidentally touch the touchscreen, which lowers the user experience.

BRIEF SUMMARY OF THE INVENTION

The disclosure provides a control method of a handheld electronic device adapted to a handheld electronic device. The handheld electronic device includes a touch panel. The control method includes: defining the touch panel into two areas with a trigger region in each; configuring the touch panel to detect a touch point; and determining whether the touch point is located in the trigger region or not, and when the touch point is located in the trigger region, forming a shielding region corresponding to the trigger region, and when the touch point is not located in the trigger region, repeatedly detecting the touch point.

In the control method of the handheld electronic device provided in the disclosure, a corresponding shielding region is formed according to a position of the touch point. The shielding region is used to avoid an accidental touch caused by a hand inadvertently touching an outer edge of a touchscreen when the user operates the handheld electronic device, thereby improving operation experience of the user.

Specific embodiments used in the disclosure are further described by using the following embodiments and drawings.

DETAILED DESCRIPTION OF THE EMBODIMENTS

Specific embodiments of the disclosure are described in further detail below with reference to schematic drawings. The advantages and features of the disclosure will become more apparent from the following description and claims. It should be noted that the drawings are all in a very simplified form and are not drawn to accurate scale, but are merely used for convenience and clarity of description of the embodiments of the disclosure.

Figure 1:
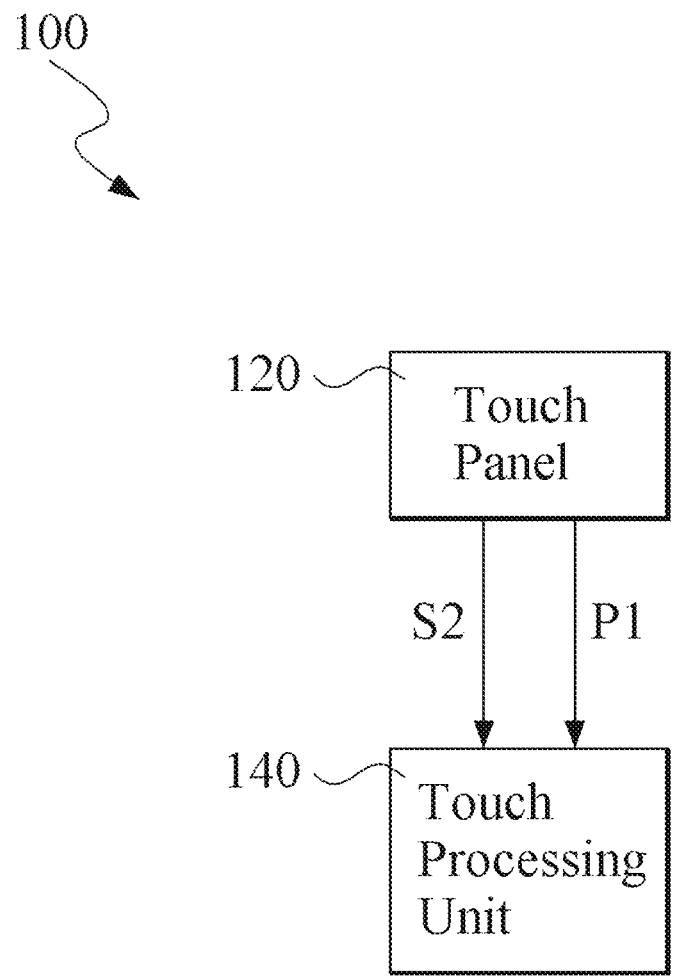
FIG. 1 is a schematic block diagram of an embodiment of a handheld electronic device according to the disclosure.

FIG. 1 is a schematic block diagram of an embodiment of a handheld electronic device according to the disclosure. As shown in the figure, a handheld electronic device 100 includes a touch panel 120 and a touch processing unit 140.

The touch panel 120 is configured to detect a touch point P1. In an embodiment, the touch point P1 is a touch point of a single-touch-point signal. However, this is not limited herein. The touch point P1 is alternatively a signal with a particular touch coordinate position such as a multi-touch-point signal. The touch processing unit 140 is electrically connected to the touch panel 120 to receive the touch point P1, and further to control an operation of the touch panel 120 according to the touch point P1. For specific operation steps of the touch processing unit 140, more detailed descriptions are given in the following paragraphs.

Figure 2:
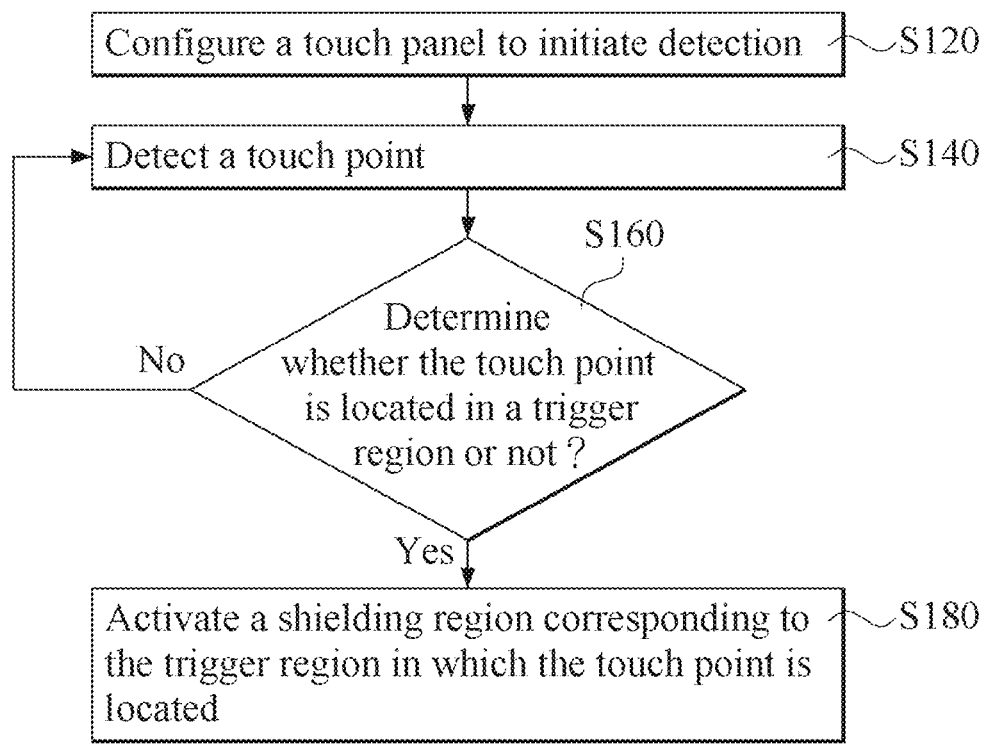
FIG. 2 is a flowchart of a first embodiment of a control method of a handheld electronic device according to the disclosure.
Figure 2A:
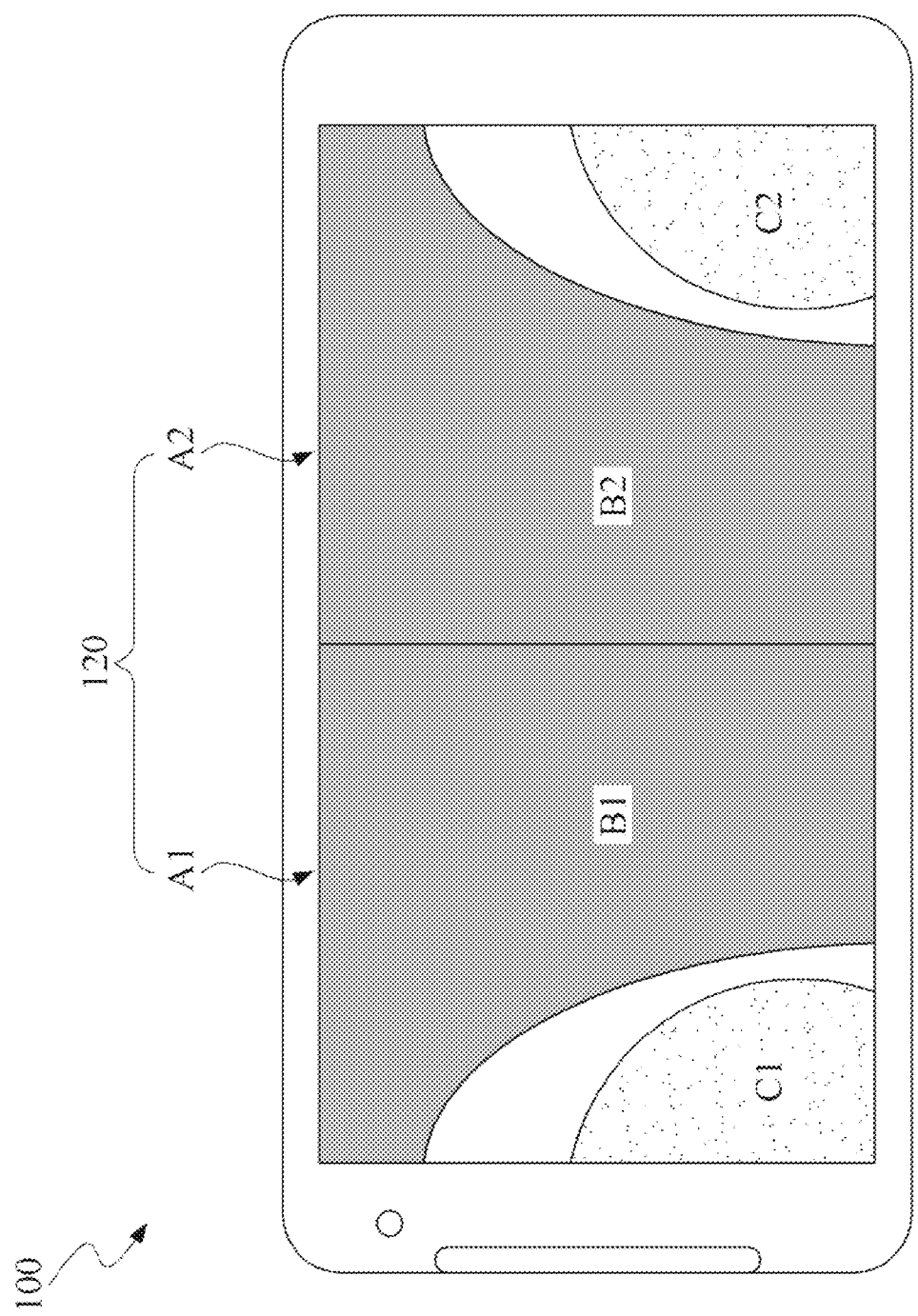
FIG. 2A illustrates the control method of FIG. 2 by using a touch panel on a handheld electronic device.

Referring to FIG. 2 and FIG. 2A together, FIG. 2 is a flowchart of a first embodiment of a control method of a handheld electronic device according to the disclosure, and FIG. 2A illustrates the control method of FIG. 2 by using a touch panel on a handheld electronic device. The control method is adapted to the handheld electronic device 100 shown in FIG. 1, and is performed by a touch processing unit 140.

The touch panel 120 is divided into two areas, and a trigger region and a shielding region are defined in each area. In an embodiment, referring to FIG. 2A, the touch panel 120 is divided into two areas A1 and A2 along a long side direction thereof, and the two areas A1 and A2 respectively correspond to a left-hand operation and a right-hand operation of a user. A trigger region B1 and a shielding region C1 are defined in the area A1, and a trigger region B2 and a shielding region C2 are defined in the area A2.

First, as shown in step S120, a touch panel is configured to execute detection. Next, as shown in step S140, a touch point P1 is detected. In other words, the steps are performed to enable a touch shielding function of the handheld electronic device 100, and a touch operation is performed by using the touch panel 120 to detect the touch point P1.

Subsequently, as shown in step S160, whether the touch point P1 is located in the trigger region B1 or B2 is determined.

When the touch point P1 is located in the trigger region B1 or B2, as shown in step S180, the shielding region C1 or C2 corresponding to the trigger region B1 or B2 in which the touch point P1 is located is activated to shield a touch detecting signal generated by an accidental touch on a screen.

In an embodiment, when the touch point P1 is located in the trigger region B1 that is on the left side, the shielding region C1 is activated while the shielding region C2 is not activated. In an embodiment, when the touch point P1 is located in the trigger region B2 that is on the right side, the shielding region C2 is activated while the shielding region C1 is not activated.

In an embodiment, when the touch point P1 is a multi-touch-point signal, and the multi-touch points P1 are located in both the trigger region B1 that on the left side and the trigger region B2 that is on the right side, the shielding region C1 and C2 are both activated.

When the touch point P1 is not located in the trigger region B1 or B2, the procedure returns back to step S140, and the shielding region C1 or C2 is not activated.

When the user taps the touch panel 120 while operating the handheld electronic device 100, it is easy to accidentally touch the touch panel 120 and thus a false touch detecting signal generates. Based on the method of the present disclosure, regions that likely to be accidentally touched are configured as the shielding regions C1 and C2 to shield a generated accidental touch signal. In this way, an accidental touch behavior of a user is prevented from affecting correct operation of the handheld electronic device 100, thereby improving operation experience of the user.

In an embodiment, the touch panel is divided into two areas A1 and A2, which respectively correspond to a left-hand operation and a right-hand operation of a user. However, this is also not limited in the disclosure. In an embodiment, the touch panel 120 is divided into three or more areas according to requirements. Using three areas as an example, the touch panel 120 is divided into three areas along a long side thereof, namely, a left area, a middle area, and a right area. Using four areas as an example, the touch panel 120 is divided into four areas, namely, an upper left area, an upper right area, a lower left area, and a lower right area. In addition, sizes of the areas are also adjusted according to actual requirements.

A shape of the shielding region is defined according to requirements. As shown in FIG. 2A, in an embodiment, the shielding regions C1 and C2 are in a shape of a sector, and are located close to two corners of the touch panel 120 held by two hands. However, this is also not limited herein. In another embodiment, the shielding regions C1 and C2 are alternatively in a shape of a triangle or a square.

Positions of the shielding regions are also defined according to requirements. As shown in FIG. A, because when the user operates the handheld electronic device 100, positions close to two corners of the touch panel 120 held by two hands are most likely to be accidentally touched. In an embodiment, the shielding regions C1 and C2 are configured on the lower left corner and the lower right corner of the touch panel 120, to shield a signal that is generated by an accidental touch.

In addition, as shown in FIG. 2A, in an embodiment, the shielding regions C1 and C2 are not connected to the trigger regions B1 and B2 correspondingly. However, this is not limited herein. In an embodiment, the shielding regions C1 and C2 are configured to connect the trigger regions B1 and B2 if the shielding regions C1 and C2 do not overlap the trigger regions B1 and B2 respectively.

Figure 3:
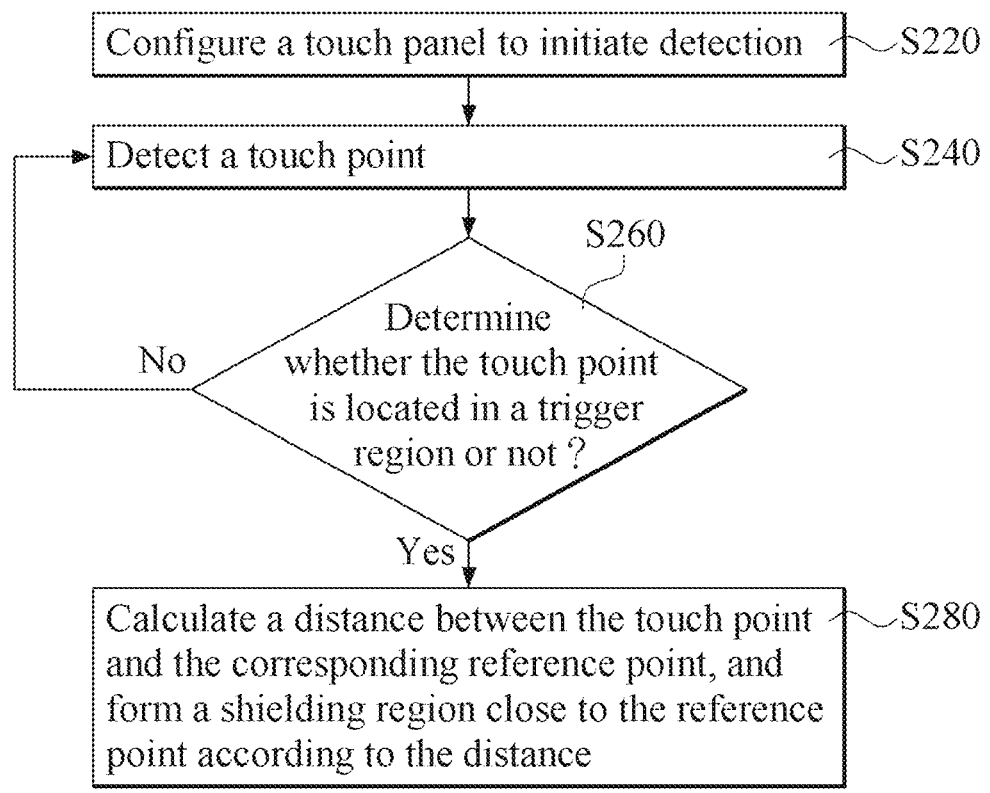
FIG. 3 is a flowchart of a second embodiment of a control method of a handheld electronic device according to the disclosure.
Figure 3A:
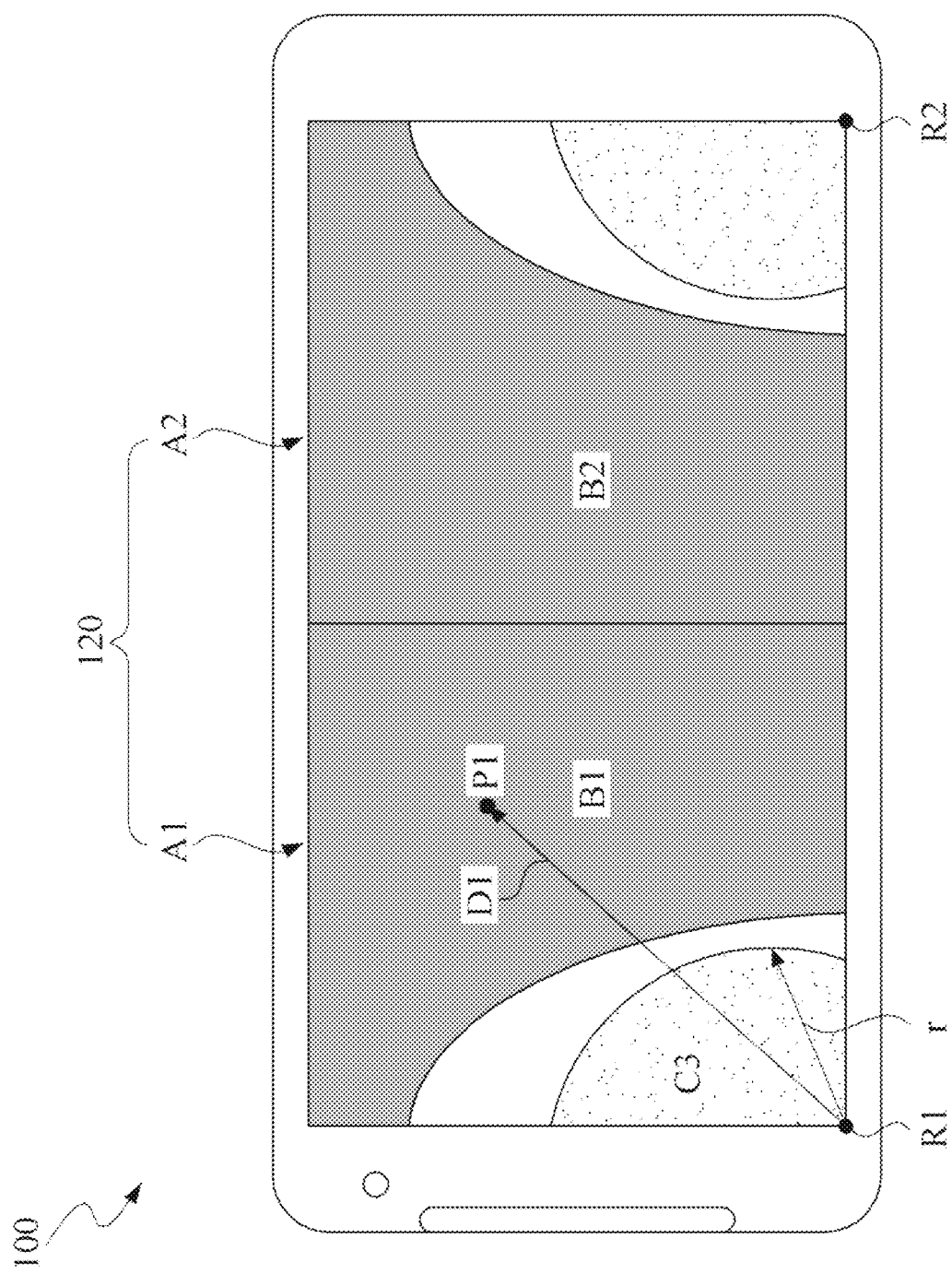
FIG. 3A illustrates the control method of FIG. 3 by using a touch panel on a handheld electronic device.

FIG. 3 is a flowchart of a second embodiment of a control method of a handheld electronic device according to the disclosure. FIG. 3A illustrates the control method of FIG. 3 by using a touch panel on a handheld electronic device. The control method is adapted to the handheld electronic device 100 shown in FIG. 1, and is performed by the touch processing unit 140.

The touch panel 120 is divided into two areas, and a trigger region and a reference point are defined in each area.

In an embodiment, referring to FIG. 3A, the touch panel 120 is divided into two areas A1 and A2 along a long side direction thereof, and the two areas A1 and A2 respectively correspond to a left-hand operation and a right-hand operation of a user. A trigger region B1 and a reference point R1 are defined in the area A1, and a trigger region B2 and a reference point R2 are defined in the area A2. Compared with FIG. 2A, the reference points R1 and R2, instead of the shielding regions C1 and C2 with fixed scopes, are defined on the touch panel 120 in this embodiment. In an embodiment, as shown in FIG. 3A, the reference points R1 and R2 are located on corners of the touch panel 120.

First, as shown in step S220, a touch panel is configured to initiate detection. Next, as shown in step S240, a touch point P1 is detected. In other words, the steps are performed to enable a touch shielding function of the handheld electronic device 100, and a touch operation is performed by using the touch panel 120 to detect the touch point P1. The step is the same as step S140 in FIG. 2.

Subsequently, as shown in step S260, whether the touch point P1 is located in the trigger region B1 or B2 is determined.

When the touch point P1 is located in trigger region B1 or B2, as shown in step S280, a distance between the touch point P1 and the corresponding reference point R1 or R2 is calculated, and a shielding region C3 close to the reference point R1 or R2 is formed according to the calculated distance, to shield a touch detecting signal generated by an accident touch on a screen. Referring to FIG. 3A, in an embodiment, when the touch point P1 is located in the trigger region B1 that is on the left side, the step is performed to calculate a distance D1 between the touch point P1 and the reference point R1 that is on the left side, and form the shielding region C3 close to the reference point R1 according to the distance D1.

When the touch point P1 is not detected in the trigger region B1 or B2, the procedure returns back to step S240, and the shielding region C3 is not formed.

Different from the embodiment of FIG. 2 in which the shielding regions C1 and C2 with fixed scopes are predefined, a size of the shielding region C3 in this embodiment changes with the position of the touch point P1. In an embodiment, the size of the shielding region C3 is proportional to the distance D1 between the touch point P1 and the reference point R1 corresponding thereto.

In an embodiment, as shown in FIG. 3A, the shielding region C3 is in a shape of a sector, and a radius r of the sector is the distance D1 between the touch point P1 and the reference point R1 multiplied by a preset ratio. In an embodiment, the preset ratio is less than 0.5. However, this is not limited herein. The shielding region C3 is alternatively in a shape of a triangle, a square, or an ellipse, and the shielding region C3 includes a specific size, such as a side length of a triangle, a diagonal length of a square, or a long axis length and a short axis length of an ellipse, that is the distance D1 between the touch point P1 and the reference point R1 multiplied by a preset ratio.

Compared with the embodiment of FIG. 2 and FIG. 2A in which the shielding regions C1 and C2 with fixed scopes are formed on the touch panel 120, a scope of the shielding region C3 of this embodiment changes with the position of the touch point P1, which helps in responding to different accidental touch states derived from different tap positions during an operation process of a user.

In an embodiment, when a tap position (that is, the position of the touch point P1 of a touch point S1) of the user is close to a center of the touch panel 120, in step S280, a relatively large shielding region C3 is formed to respond to an accidental touch on the touch panel 120 by the user's palm. On the contrary, when the click position of the user is close to an edge of the touch panel 120, a relatively small shielding region C3 is formed in step S280.

Figure 4:
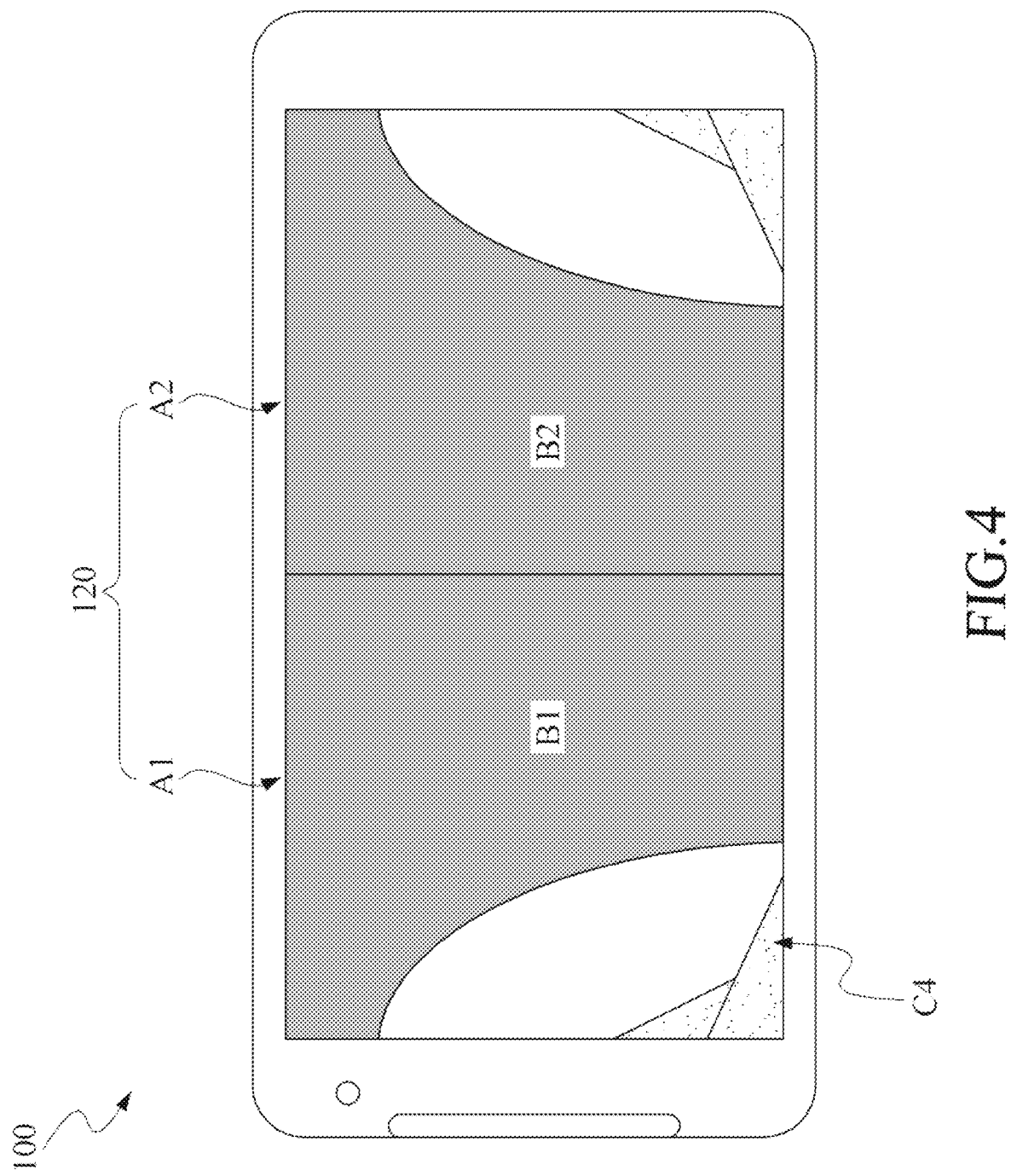
FIG. 4 shows another embodiment of a shielding region formed on a handheld electronic device according to the disclosure.

FIG. 4 shows another embodiment of a shielding region formed on a handheld electronic device according to the disclosure. Compared with the embodiment in FIG. 2A, the shielding regions C1 and C2 are in a shape of a sector. A shielding region C4 in this embodiment is formed by two triangles that overlap each other on a corner of the touch panel 120, and a scope and a position thereof are pre-configured. In an embodiment, as shown in FIG. 4, the shielding region C4 is located on the lower left corner and the lower right corner of the touch panel 120, that is, an area of the touch panel 120, in which incorrect touch points are most likely to be generated. However, this is also not limited in the disclosure. In an embodiment, the shielding region C4 is alternatively defined on the touch panel by a single triangle or a square.

Figure 5:
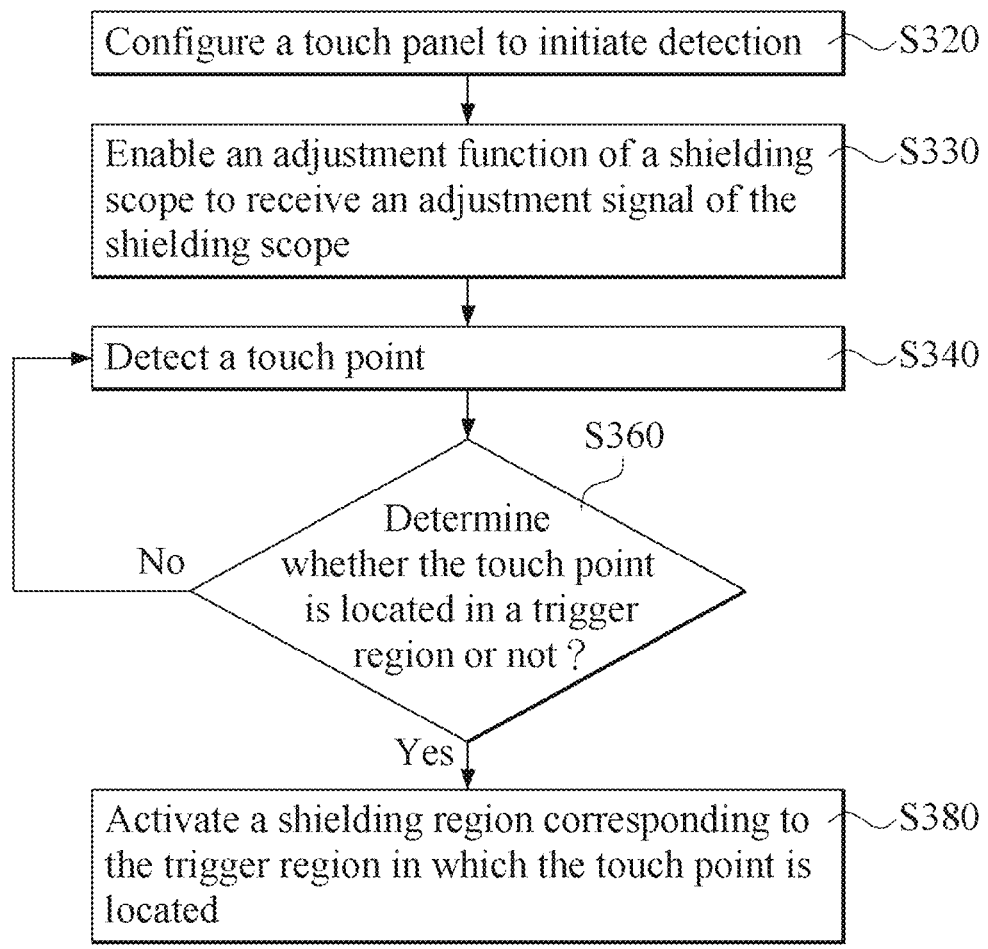
FIG. 5 is a flowchart of a third embodiment of a control method of a handheld electronic device according to the disclosure.
Figure 5A:
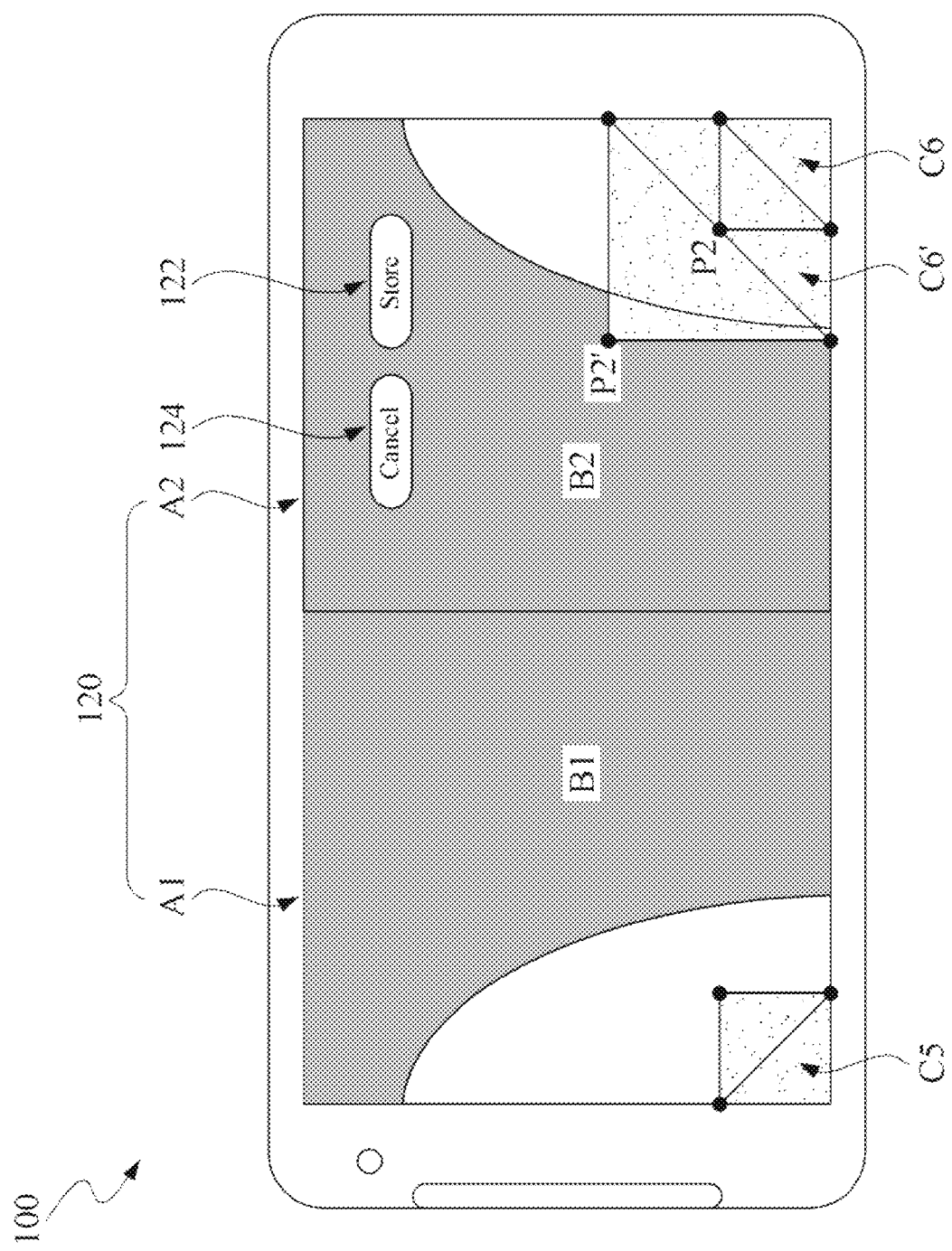
FIG. 5A illustrates the control method of FIG. 5 by using a touch panel on a handheld electronic device.

FIG. 5 is a flowchart of a third embodiment of a control method of a handheld electronic device according to the disclosure. FIG. 5A illustrates the control method of FIG. 5 by using a touch panel on a handheld electronic device. The control method is adapted to the handheld device 100 shown in FIG. 1, and is performed by the touch processing unit 140.

Similar to FIG. 2A, the touch panel 120 is divided into two areas A1 and A2. A trigger region B1 and a preset shielding region C5 are defined in the area A1, and a trigger region B2 and a preset shielding region C6 are defined in the area A2.

First, as shown in step S320, a touch panel is configured to initiate detection. Next, as shown in step S330, an adjustment function of a shielding scope is enabled to receive an adjustment signal S2 of the shielding scope, and scopes of the shielding regions C5 and C6 are adjusted according to the adjustment signal S2 of the shielding scope. In an embodiment, the adjustment signal S2 of the shielding scope is a touch point signal. A user configures scopes of the shielding regions C5 and C6 through the touch panel 120 in a sliding dragging manner. In another embodiment, the shielding regions C5 and C6 are located on corners of the touch panel 120.

In an embodiment, as shown in FIG. 5A, using the shielding region C6 that is on the right side as an example, the user moves a corner point P2 of the shielding region C6 to a corner point P2' in a sliding dragging manner, to obtain a shielding region C6' through adjustment. In this way, sizes and shapes of the shielding regions C5 and C6 are adjusted according to a situation. When finishing the configuration, the user saves the configuration by clicking a Store key 122 on the touch panel 120, or cancels the configuration by clicking a Cancel key 124.

In FIG. 5A, the shielding regions C5 and C6 are in a shape of a square. However, this is not limited herein. According to actual requirements, the shielding regions C5 and C6 are alternatively in a shape including an adjustable size for a user to perform adjustment such as a triangle or a sector. In an embodiment, the adjustable size is a diagonal length and an inclination angle of a square, a length and an inclination angle of an oblique side of a triangle, a radius of a sector, or the like.

In an embodiment, the shielding regions C5 and C6 located on two corners of the touch panel are symmetrical to each other. The user only needs to configure the shielding region C5. That is, configuration of the two shielding regions C5 and C6 are automatically performed. However, this is not limited herein. Because operation habits of right and left hands of the user are different, in an embodiment, the shielding regions C5 and C6 are alternatively adjusted separately.

Subsequent steps S340, S360 and S380 of the control method is similar to steps S140, S160 and S180 in FIG. 2, and a difference therebetween only lies in different formed shielding regions. Details of the steps are not described herein again.

In an embodiment, the scopes of the shielding regions C1, C2, C3, and C4 in FIG. 2 to FIG. 4A are pre-configured in the touch processing unit 140 in a form of software or firmware. In an embodiment, the shielding regions C5 and C6 shown in FIG. 5A are adjusted according to user's habits thus to improve operation experience of the user.

In the handheld electronic device and the control method provided in the disclosure, a corresponding shielding region is formed according to the position of the touch detecting signal, to prevent the user from accidentally touching the screen when the user operates the handheld electronic device, thereby improving the operation experience of the user.

The foregoing descriptions are merely preferred embodiments of the disclosure and are not intended to limit the disclosure in any way. Equivalent replacement or modification, made by any person skilled in the art in any form, to the technical means and technical contents disclosed by the disclosure without departing from the scope of the technical means of the disclosure does not depart from the contents of the technical means of the present disclosure and still falls within the protection scope of the disclosure.

What is claimed is:

1. A control method of a handheld electronic device, wherein the handheld electronic device comprises a touch panel on which a reference point, at least one trigger region and at least one shielding region are defined, and the control method comprises:
    initiating the trigger region of the touch panel;
    detecting a touch point on the touch panel; and
    determining whether the touch point is located in the trigger region or not, and when the touch point is located in the trigger region, calculating a distance between the touch point and the reference point, and defining a scope of the shielding region according to the distance and activating the shielding region; and
    when the touch point is not located in the trigger region, repeatedly detecting the touch point on the touch panel,
    wherein the shielding region includes a specific size that is the distance multiplied by a preset ratio.

2. The control method according to claim 1, wherein the shielding region is adjacent to the trigger region.

3. The control method according to claim 1, wherein the shielding region is located on a corner of the touch panel.

4. The control method according to claim 1, wherein the shielding region is in a shape of a sector or a triangle.

5. The control method according to claim 1, wherein the reference point is located on a corner of the touch panel.

6. The control method according to claim 1, wherein the shielding region is in a shape of a sector, and a radius of the sector is the distance multiplied by the preset ratio.

7. The control method according to claim 1, wherein the shielding region is defined according to an adjustment signal of a shielding scope.

8. The control method according to claim 7, wherein the adjustment signal of the shielding scope is a touch point signal.

\* \* \* \* \*

UNITED STATES PATENT AND TRADEMARK OFFICE
CERTIFICATE OF CORRECTION

PATENT NO. : 11,287,923 B2
APPLICATION NO. : 16/915501
DATED : March 29, 2022
INVENTOR(S) : I-Hsi Wu Page 1 of 1

It is certified that error appears in the above-identified patent and that said Letters Patent is hereby corrected as shown below:

In the Specification

Column 3, Line 44 "FIG. A" should be --FIG. 2A--

Column 6, Line 11 "FIG. 4A" should be --FIG. 4--

Signed and Sealed this
Sixteenth Day of August, 2022

Katherine Kelly Vidal
*Director of the United States Patent and Trademark Office*